(No Model.)  6 Sheets—Sheet 1.

G. W. STEELE.
MACHINE FOR SHAPING MEETING RAILS.

No. 283,678.  Patented Aug. 21, 1883.

Witnesses
Richard C. Healy
Kittie Inglis

Inventor
George W. Steele
by John Inglis atty (No Model.) 6 Sheets—Sheet 2.

G. W. STEELE.
MACHINE FOR SHAPING MEETING RAILS.

No. 283,678. Patented Aug. 21, 1883.

Witnesses
Richard A. Healy
Kittie Inglis.

Inventor
George W. Steele
By John Inglis Atty (No Model.) 6 Sheets—Sheet 3.

G. W. STEELE.
MACHINE FOR SHAPING MEETING RAILS.

No. 283,678. Patented Aug. 21, 1883.

Witnesses
Richard A. Haly
Kittie Inglis

Inventor
George W. Steele
by John Inglis atty (No Model.)  6 Sheets—Sheet 4.

G. W. STEELE.
MACHINE FOR SHAPING MEETING RAILS.

No. 283,678.  Patented Aug. 21, 1883.

Witnesses
Richard A. Healy
Kittie Inglis

Inventor
George W. Steele
by John Inglis atty (No Model.) 6 Sheets—Sheet 5.
G. W. STEELE.
MACHINE FOR SHAPING MEETING RAILS.
No. 283,678. Patented Aug. 21, 1883.
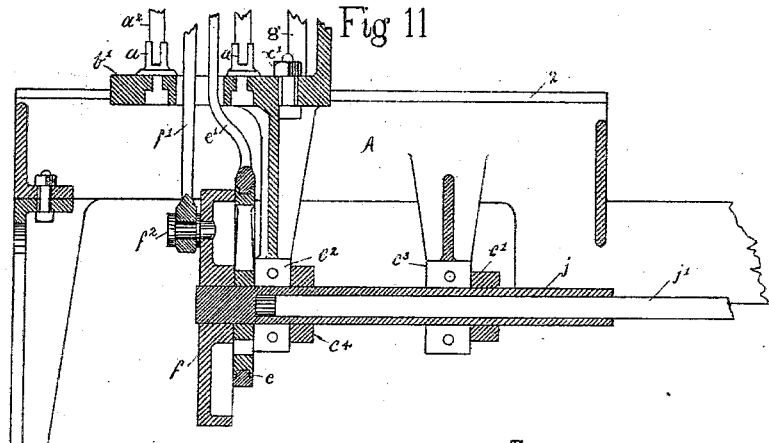
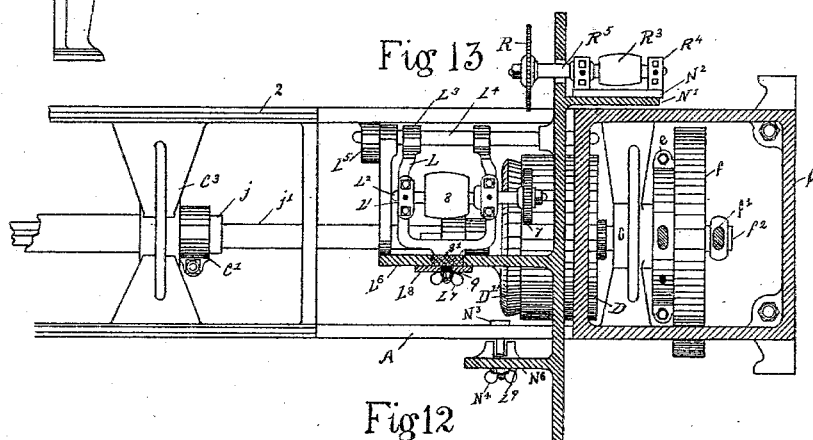
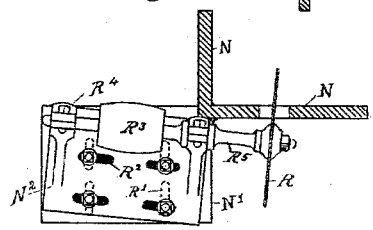
Witnesses
Richard C. Healy
Kittie Inglis
Inventor
George W. Steele
by John Inglis atty (No Model.)
G. W. STEELE.
MACHINE FOR SHAPING MEETING RAILS.
No. 283,678. Patented Aug. 21, 1883.
Fig 15     Fig 14     Fig 16
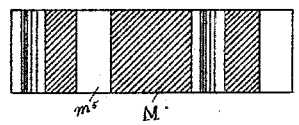
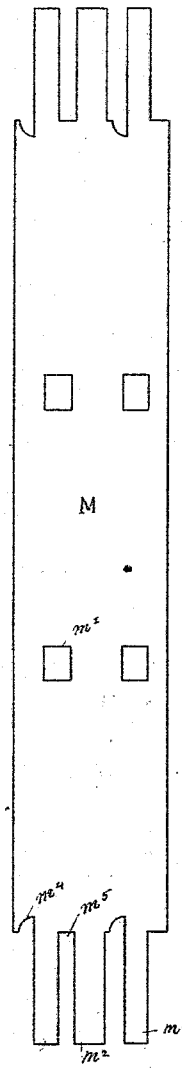
Fig 17
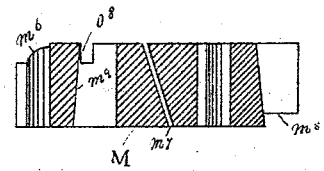
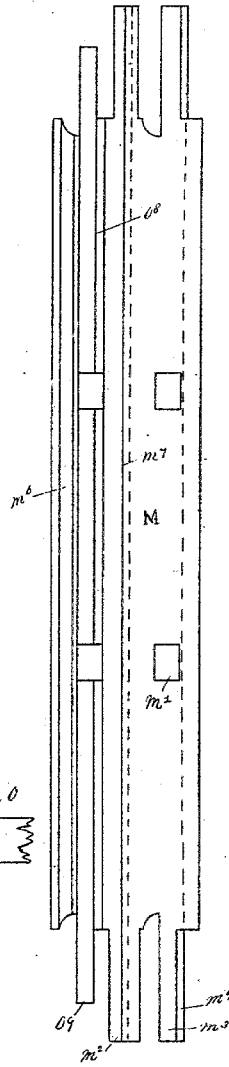
Fig 18
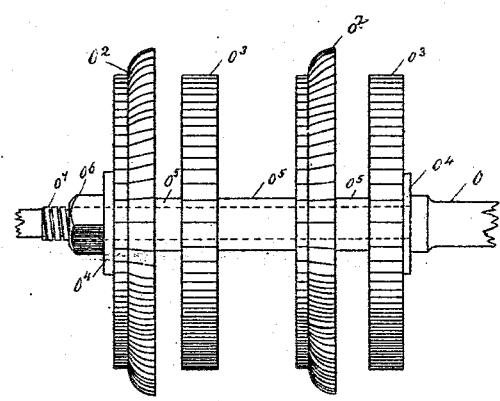
Witnesses
Richard A. Healy
Kittie Inglis
Inventor
George W. Steele
by John Inglis atty

UNITED STATES PATENT OFFICE.

GEORGE W. STEELE, OF PATERSON, NEW JERSEY.

MACHINE FOR SHAPING MEETING-RAILS.

SPECIFICATION forming part of Letters Patent No. 283,678, dated August 21, 1883.

Application filed December 27, 1881. (No model.)

*To all whom it may concern:*

Be it known that I, GEORGE W. STEELE, a citizen of the United States, residing at Paterson, Passaic county, State of New Jersey, have invented a new and useful Improvement in Machines for Shaping Meeting-Rails, of which the following is a specification, reference being had to the accompanying drawings, forming a part thereof.

The object of the invention is to produce a machine which will work, form, construct, and complete a pair of meeting-rails for top and bottom sashes by one continuous operation.

The invention consists in a series of cutters and routing tools arranged in frames that work on adjustable guide-rods, bits and chisels arranged in adjustable heads, on beams secured in frames that work over stationary guides, and molding mechanism, &c., which I will hereinafter more fully explain.

Figure 1:
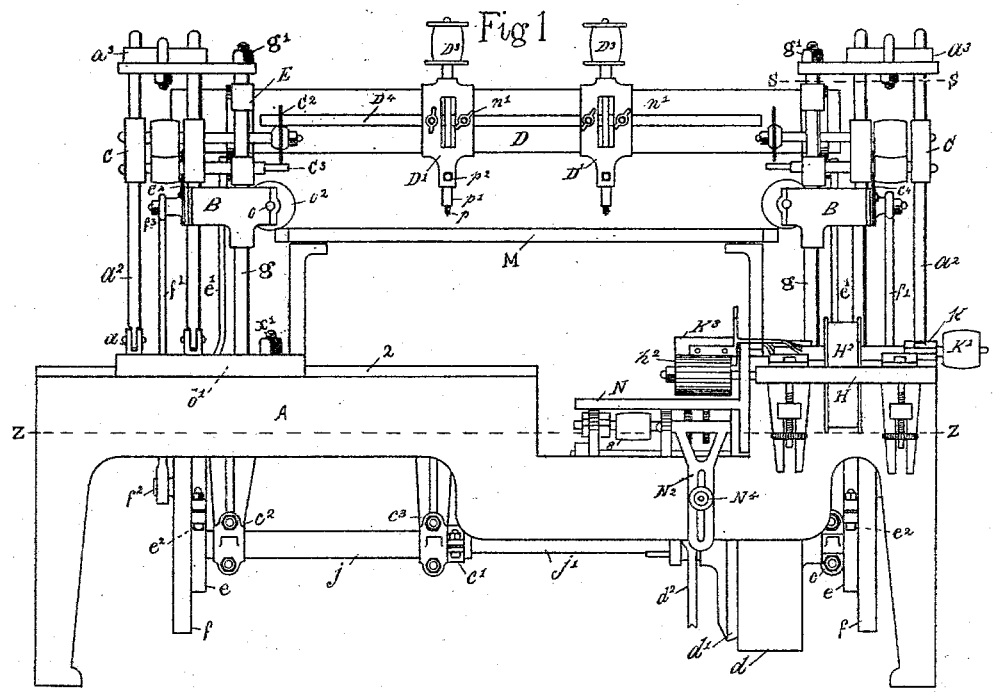
Figure 2:
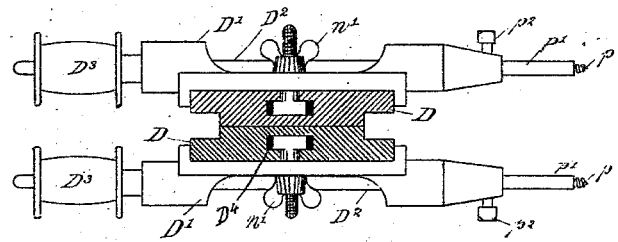
Figure 3:
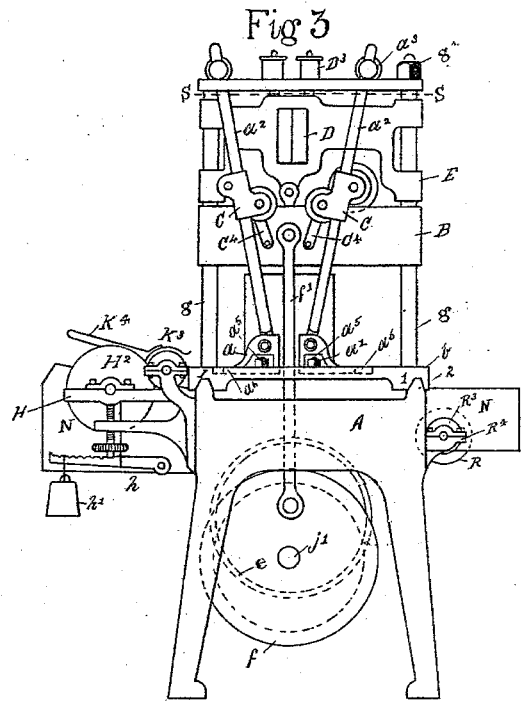
Figure 4:
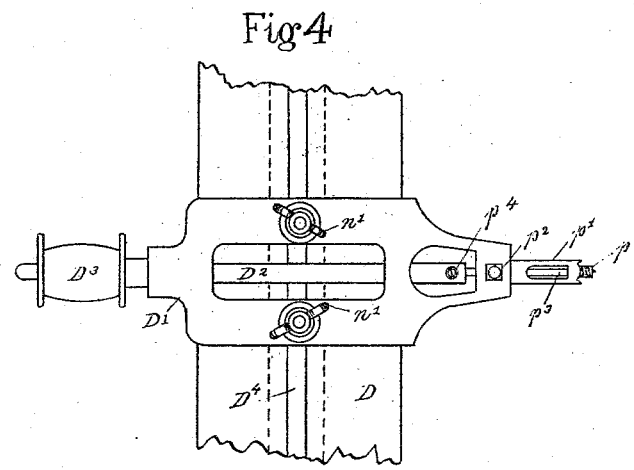
Figure 5:
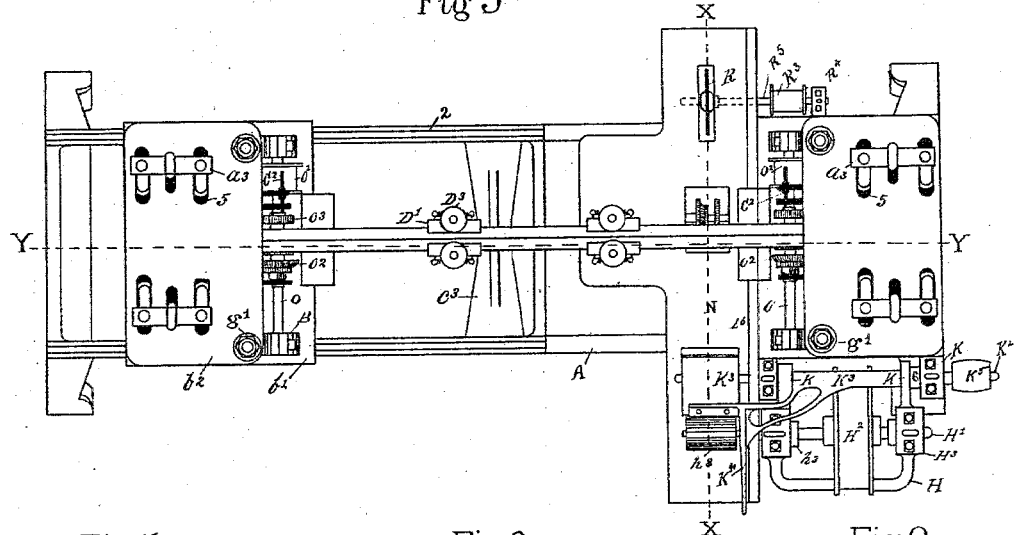
Figure 7:
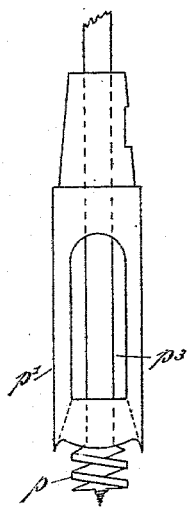
Figure 6:
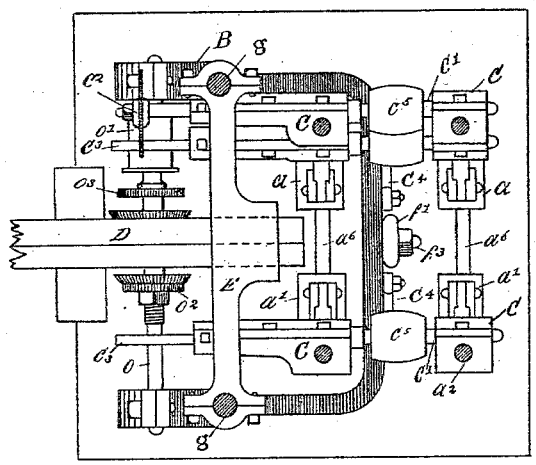
Figure 8:
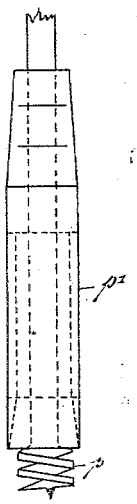
Figure 9:
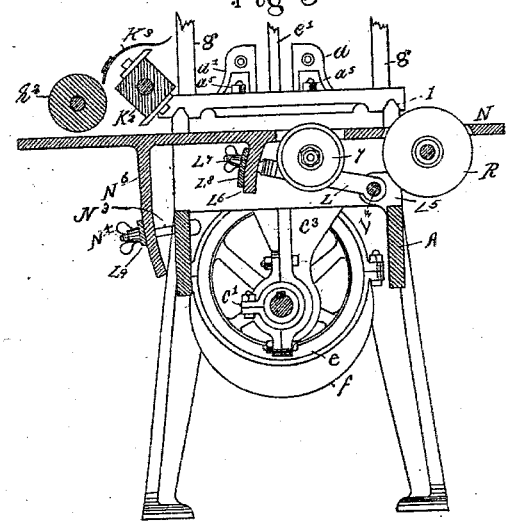
Figure 10:
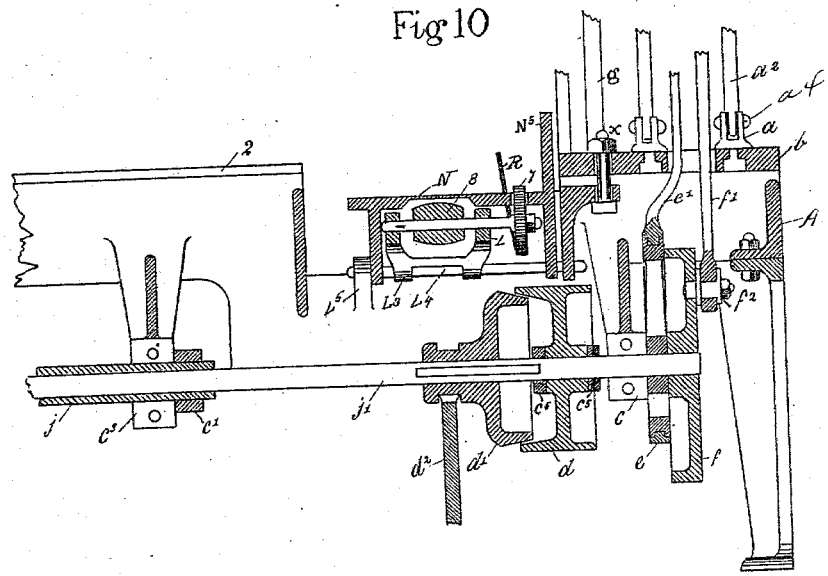

Figure 1 of the drawings is a front elevation of my newly-invented meeting-rail machine, showing adjustable heads, guides, eccentrics, crank-disks, connecting-rods, movable and stationary heads, cutter and saw frames, feed-roller, and driving-shaft, &c. Fig. 2 is a detail view of adjustable heads on the beams, partly sectional, showing thumb-screws, bits, pulleys, &c. Fig. 3 is an end elevation, showing saw and cutter frames on the guide-rods, movable brackets, eccentrics, feed-roller, crank-disk, parting-saws, presser-weight, &c. Fig. 4 is a front detailed view of adjustable heads on beams, showing bit, cutter, set-screws, shaft, pulley, &c. Fig. 5 is a plan of the machine. Fig. 6 is a plan of the stationary head, partly sectional, taken on line $s\,s$, Fig. 1. Fig. 7 is a front elevation of chisel and bit. Fig. 8 is a side elevation of the same. Fig. 9 is a cross-sectional elevation taken on line $x\,x$. Fig. 10 is a longitudinal sectional elevation taken on the line $y\,y$. Fig. 11 is the same, showing movable head. Fig. 12 is a view, partly sectional, of parting-saw. Fig. 13 is a plan, partly sectional, taken on the line $z\,z$, Fig. 1. Fig. 14 is an end view of meeting-rail. Fig. 15 is a plan of the same. Fig. 16 is a meeting-rail completed. Fig. 17 is an end view of the same. Fig. 18 is a view of heads on shaft.

A represents a metal frame, on which and to which frame are arranged and secured the various devices and driving mechanism.

To the lower part of the frame A there are secured bearings $c\,c^3$, in which bearings there is journaled a driving-shaft, $j'$. The shaft $j'$ is provided with a driving-pulley, $d$. The pulley $d$ is located on the driving-shaft $j'$, under the stationary head $b$, and is provided with a suitable clutch on its interior surface, to adapt it to engage with a friction-clutch, $d'$, that is arranged on the driving-shaft $j'$. The friction-clutch $d'$ is constructed with a sleeve, to adapt the same to slide over the driving-shaft $j'$ when the same is being engaged and disengaged with and from the clutch-pulley $d$ by means of the clutch-shifter $d^2$, that is arranged in a suitable recess formed in the sleeve of the friction-clutch therefor.

On the driving end of the driving-shaft $j'$ there are arranged eccentric $e$ and crank-disk $f$. The eccentric $e$ has formed on its periphery a circumferential groove to accommodate the strap of a connecting-rod, $e'$, which is adapted to work in the circumferential groove formed therefor in the periphery of the eccentric $e$, and which is secured in the groove by means of a bolt, $e^2$, as shown in Fig. 1. The crank-disks $f$ have a stud, $f^2$, suitably formed and fastened therein, to which stud there is attached a connecting-rod, $f'$.

In the bearings $c^2\,c^3$, one of which is secured to the frame A and the other to the movable head $b'$, there is journaled a telescoping shaft, $j$, that slides over the driving-shaft $j'$ and forms one of the bearings for the same. The outer end of the telescoping shaft or tube $j$ has secured thereon eccentric $e$ and crank-disk $f$, which are constructed in every particular the same as those on the end of the driving-shaft $j'$, already described, having bolt $e^2$ and stud $f^2$, to which is secured a connecting-rod, $e'$, and attached a connecting-rod, $f'$, Fig. 1. The telescoping shaft $j$ is secured to the driving-shaft $j'$ by means of an adjustable clip, $c'$, for rotating purposes. The movable head $b'$ is provided with suitable grooves, 1, that are arranged on the under side of the same, which grooves slide over corresponding ribs, 2, that are formed on the top of the frame A, Fig. 3. The stationary head $b$ is secured to the frame A by a bolt, $x$, and the movable head by a bolt, $x'$. On the heads $b\ b'$ there are arranged movable brackets $a\ a'$. The brackets are provided with ribs on the bottom, that work or run in grooves $a^6$, prepared therefor in the heads $b\ b'$, Fig. 3, and they are held in their adjusted positions by bolts $a^5$. The movable brackets $a\ a'$ are formed with open centers, and are thereby adapted to receive and accommodate the ends of sloping guide-rods $a^2$, which are pivoted therein on pivots $a^4$. The tops of the sloping guide-rods are arranged and are suitably secured in holes prepared for them in bars $a^3$, and work in suitable slots, 5, formed in plates $b^2$. The plates $b^2$ are secured to the tops of the vertical guide-rods $g$ by suitable screw-nuts, $g'$, which screw on corresponding threads cut on the tops of the guide-rods $g$. The vertical guide-rods $g$ are secured at the bottom in the heads $b\ b'$. The plates $b^2$ have suitable holes formed in them, which adapt the plates to pass over the tops of the vertical guide-rods $g$, and which are firmly secured thereto by nuts $g'$. Arranged on the vertical guide-rods $g$ are frames B.

The frames B are constructed with suitable sleeves, to adapt them to slide up and down on and over the vertical guide-rods $g$. The frames are provided with suitable studs on their outer ends to adapt them to connect with connecting-rods $f'$, which connect with the crank-disks $f$. The connecting-rods are secured to the frames B by nuts $f^3$, Fig. 1. The frames B are constructed with suitable arms, in which to journal shafts $o$, which shafts are journaled therein. The shafts $o$ are provided with cutters $o^2\ o^3$ and pulleys $o'$, Fig. 5. On the vertical guide-rods $g$ there are also arranged frames E. The frames E are constructed with suitable sleeves to adapt them to slide on and over the guide-rods $g$, and are cut away in the center at the ends, so as to have small bearing-surfaces on the guide-rods $g$, Fig. 3. The frames E are provided with suitable openings to accommodate beams D, that are suitably secured therein, Fig. 3.

The frames C are constructed with suitable sleeves to adapt them to slide on and over the sloping guide-rods $a^2$, and have journaled in them shafts $C'$, on which shafts there are suitably arranged routers $C^3$ and crosscut-saws $C^2$. The frames C are connected to the frames B by short connecting-rods $C^4$, Fig. 3.

The beams D, which are arranged in openings in the frames E, are provided with one or more heads, $D'$, that are movable thereon. The heads $D'$ are constructed with recessed backs and cut-away fronts, which adapts the heads to rest on and be supported by the beams. The heads are held in position on the beams D by thumb-screws $N'$, that slide in suitable channels, $D^4$, that are provided for them in the beams D, Fig. 2. The heads are provided with suitable shafts, $D^2$, having pulleys $D^3$. The shafts, which are suitably journaled in the heads $D'$, are provided with suitable holes in the lower ends of the same, to accommodate bits $p$, which are held therein by set-screws. The heads $D'$ are provided with suitable openings in their lower ends, to accommodate hollow chisels $p'$, through which the bits pass. The chisels $p'$ are held in the heads by set-screws $p^2$.

Having filed a subsequent application, numbered 99,232, showing and claiming a part of the same subject-matter of invention contained herein, I do hereby disclaim the subject-matter described and claimed in the subsequent application No. 99,232, filed June 26, 1883, and described as follows:

The frame H is constructed with arms that pivot on bearings K. The bearings K have collars 6 formed thereon, to accommodate the arms of the frame H, which pivots thereon. The bearings K, to which the frame is pivoted, are secured to the frame A, and have a shaft, $K'$, journaled therein. The shaft $K'$ is provided with a pulley, $K^5$, and head $K^2$. The frame H is also provided with bearings $H^3$, in which bearings there is journaled a shaft, $H'$, having a pulley, $H^2$. The shaft is provided with collars $h^3$, to prevent the lateral movement of the shaft $H'$. The shaft $H'$ is also provided with a feed-roller, $h^8$. Suitably secured to the frame A there is a guard-frame, $K^3$, having an arm, $K^4$, Fig. 5. The frame L (shown in Fig. 13) is constructed with arms $L'$, that pivot on a pivot-rod, $L^4$. The pivot-rod $L^4$ is secured to a projecting arm, $L^5$, that is fastened to the frame A. The frame L is provided with bearings $L'$, in which bearings there is journaled a shaft, $L^2$, on the end of which shaft there is arranged a head, 7. The end of the frame L is secured in a hanging slotted bracket, $L^6$, by means of a thumb-screw, $L^7$, against a washer, $L^8$, to the frame N, which frame is also pivoted on the pivot-rod $L^4$, and is held by means of a thumb-screw, $N^4$, to to a stud, $L^9$, that is secured to the frame A, Fig. 9. To the bracket $N'$ on the frame N there is suitably secured, by bolts that are arranged in transversely-arranged slots $R'\ R^2$, a plate-bracket, $N^2$, in which there are arranged suitable bearings, $R^4$, to journal a shaft, $R^5$. On the end of the shaft $R^5$, arranged in the plate-bracket $N^2$, there is suitably arranged and secured a parting-saw, R, Fig. 12.

Operation: The meeting-rails M to be manipulated, being of a suitable length, width, and thickness for a pair of meeting-rails for top and bottom sashes, are placed on the heads $b\ b'$, the head $b'$ having been adjusted by unscrewing the bolt $x'$ and clip $c'$, which action admits of the movable head $b'$ being moved to suit the length of the rails to be manipulated, the head sliding in its action on the rib 2 and groove 1, Fig. 3. When the head $b'$ is being moved on the groove 1 and rib 2, all of its devices are moved therewith, they being secured thereto. When thus adjusting the head $b'$ to suit the length of the rails M, the telescoping shaft or tube $j$ slides over the driving-shaft $j'$, and is secured thereto for purposes of rotation by the clip $c'$. The adjustment of the head $b'$ to suit the length of the rails to be manipulated having been made in the manner stated, the bolt $x'$ and clip $c'$ are screwed up, which action holds the movable head $b'$ to its adjustment with its devices and the telescoping shaft or tube $j$ to the driving-shaft $j'$, to be rotated thereby. The friction-clutch $d'$ is thrown into engagement with the clutch-pulley $d$, which is supposed to be in motion, by means of the clutch-shifter $d^2$. The machine having been put in motion by the engagement of the clutch and clutch-pulley in the manner stated, the cutters $o^3$ and cutters $o^2$, arranged on shafts $o$, journaled in frames B, are brought down on the guide-rods $g$ into contact with the rails M on the heads $b$ $b'$ by the action of the connecting-rods $f'$, secured to the frame B by nut $f^3$, and crank-disks $f$, secured to the connecting-rod $f'$ by studs $f^2$. In their contact with the rails M the cutters $o^3$ slit the tenons $m^5$ and the cutters $o^2$ form the copes $m^4$, as shown in Fig. 15. (For form of cutters, &c., see Fig. 18.) The frame C, on which are arranged crosscut-saws $C^2$ and routers $C^3$, having been brought down on the sloping guide-rods $a^2$ by the combined action of the connecting-rods $c^4$ $f'$ and crank-disks $f$, in their contact with the rails M the routers $C^3$ form the inclined surfaces $m^8$ $m^9$, Fig. 17, and the crosscut-saws $c^2$ cut the tenons having the inclined surfaces to a suitable length to keep the same from obstructing the channels made for the cords in the stiles of the sash, Fig. 16. The sloping guide-rods can be set to give any desired incline or bevel to surfaces of the tenons by means of the movable brackets $a$ $a'$, to which the sloping guides $a^2$ are pivoted, Fig. 3, or to give any thickness to the same to suit the different thicknesses of sash. The frames E, having been brought down on the vertical guide-rods by the eccentrics $e$ and connecting-rods $e'$, with their appliances, the bits P, in their contact with the rails M, bore the holes, and the hollow chisels, through which the bits pass, square the holes made by the bits, forming thereby the mortises $m'$ for the faces of the sash, Figs. 15, 16, the core having been drawn in the operation and discharged through the opening at $p^3$.

The heads D', being movable on the beams D, can be changed or shifted from place to place when the mortises are to be made, and when adjusted are held to their adjustments by thumb-screws $n'$. There being two sets of beams and heads, both rails are mortised at the same time, Fig. 2. The tenons, copes, inclined surfaces, and mortises having been made and completed in the manner stated, all of the appliances thus far brought into contact with the rails M now rise, the work thus far performed on the rails having been performed by a single revolution of the shafts $j$ $j'$. The rails are now placed under the feed-roller $h^2$ on the frame N, and pass under the head $k^2$, where the rails for the bottom sashes have the molding $m^6$ worked there; also, the plow or groove $o^8$ for the glass, Fig. 17. The rails pass from the head $k^2$ on the frame N against the guard $N^5$ over the under head, 7, where the rabbet $m^8$ for the top sashes is formed on the rail while the same is passing, Fig. 17. The depth of the rabbet $m^8$ is regulated by raising the under head or lowering the same by means of the frame L, which works in a slot in the hanging bracket $L^6$, and which is held to its adjustment in the bracket $L^6$ by a thumb-screw, $L^7$. The table or frame N, which is pivoted on the stationary pivot-rod $L^4$, can be easily adjusted, to suit the different thicknesses of rails to be manipulated, to the head $k^2$, under which the rails pass, and the frame held to its adjustment, by the thumb-screw $N^4$ on stud $N^3$, to bracket $N^6$ and against plate or washer $L^9$, Fig. 13. The rails M pass from the under head, 7, to the parting-saw R, where the rails for the top and bottom sashes are parted or separated, and are cut and separated at the angle desired by means of the arrangement of plates $N'$ $N^2$ and transversely-arranged slots $R'$ $R^2$, by which the saw R can be thrown and held at any desired angle, as shown in Fig. 12. A suitable amount of draft can be created and given to the feed-roller $h^2$ by means of the weight $h'$, attached to weight-lever $h$, Fig. 3.

Having described my meeting-rail machine and its operation, what I claim, and desire to secure by Letters Patent, in a meeting-rail machine is—

1. The combination, with a work-supporting head provided with vertical and inclined guide-rods, of the reciprocating tool-stock B, carrying suitable tools and guided by said vertical rods, tool-stocks C, carrying suitable tools connected by links to said stock B, and guided by the inclined rods, and suitable mechanism for imparting a reciprocating movement to said stock B, substantially as described.

2. The combination, with a work-supporting head provided with vertical and inclined guide-rods, of the reciprocating tool-stock B, carrying rotary grooving-tools $o^2$ $o^3$ and guided by said vertical rods, the tool-stock C, carrying rotary routing tools $C^3$ and circular saws $C^2$, and guided by said inclined rods, and connected by links to said stock B, and suitable mechanism for reciprocating said stock B, substantially as described.

3. The combination, with a crank-supporting head provided with vertical rods and cross-bars thereon, of the inclined guide-rods $a^2$, pivoted in supporting-brackets $a$ $a'$, which are laterally adjustable upon said cross-bars, and provided with holes to receive the upper ends of said inclined rods, and cutter-stocks C, guided by said inclined rods and carrying suitable cutters, and suitable mechanism for reciprocating said cutter-stocks, whereby cuts may be made in various inclined directions by said heads or cutters, substantially as described.

4. The combination, with the supporting-frame, of the fixed head $b$, having vertically-reciprocating cutters thereon, the head $b'$, adjustable toward and from the fixed head, and carrying vertically-reciprocating cutters, the tubular shaft $j$, one end of which is journaled in a hanger depending from the movable head $b'$, while the other end slides through a fixed hanger, the shaft $j'$, carrying the driving-pulley, one end of which shaft is journaled in a hanger below head $b$, while the other end is journaled within shaft $j$, the clips $c'$ for clamping the shafts $j$ $j'$ together, crank-disks on said shafts, and rods connecting said disks to the reciprocating cutters, substantially as described.

5. The combination, with the beams D, of the cross-heads E, supporting the ends of said beams, heads $b$ $b'$, in which said cross-heads are vertically reciprocated, suitable mechanism for reciprocating them, the frames D', supported by said beams D, and adjustable longitudinally thereof, and carrying the rotary boring-tool $p$ and the chisel $p'$, surrounding said boring-tool, substantially as described.

6. The combination, with the beams D, of three cross-heads, E, supporting the ends of said beams, heads $b$ $b'$, in which said cross-heads are vertically reciprocated, suitable mechanism for reciprocating them, the frames D', supported by beams D, and adjustable longitudinally thereof, and carrying suitable mortising-cutters, substantially as described.

GEORGE W. STEELE.

Witnesses:
JOHN INGLIS,
NEWELL P. ANDRUS.